United States Patent [19]

Smith

[11] 4,024,841

[45] May 24, 1977

[54] ROTARY INTERNAL COMBUSTION ENGINE WITH OSCILLATING PISTONS

[76] Inventor: David B. Smith, 47 Maryland Place, Calgary, Alberta, Canada

[22] Filed: Oct. 7, 1975

[21] Appl. No.: 620,507

Related U.S. Application Data

[63] Continuation-in-part of Ser. No. 518,093, Oct. 25, 1974, abandoned.

[52] U.S. Cl. .................................. 123/8.45; 418/68
[51] Int. Cl.² ........................................ F02B 55/16
[58] Field of Search ............ 418/68; 123/8.45, 8.47

[56] References Cited

UNITED STATES PATENTS

| | | | |
|---|---|---|---|
| 1,904,373 | 4/1933 | Kempthorne | 123/8.45 X |
| 1,967,167 | 7/1934 | Weis | 418/68 |
| 2,069,646 | 2/1937 | Cohen | 123/8.45 |
| 2,622,569 | 12/1952 | Rochefort | 123/8.45 |
| 2,808,006 | 10/1957 | Paulsmeier et al. | 418/68 |
| 3,075,506 | 1/1963 | Berry | 123/8.47 |
| 3,549,286 | 12/1970 | Moriarty | 418/68 X |
| 3,702,602 | 11/1972 | Lotesto | 418/68 |

*Primary Examiner*—Carlton R. Croyle
*Assistant Examiner*—Leonard Smith
*Attorney, Agent, or Firm*—Watson, Cole, Grindle & Watson

[57] ABSTRACT

This invention relates to an internal-combustion engine of generally spherical configuration having a generally spherical rotor mounted on a rotor shaft in a generally spherical shell. Combustion chambers are formed in appropriate recesses in the rotor and the inside of the spherical shell. The recesses are bounded by fixed partitions and movable pistons between the fixed partitions so that a series of combustion chambers are formed one on each side of each piston. The pistons are each connected to a central hub at the center of the rotor, and the hub is rotatable to a limited extent in a direction perpendicular to the rotor shaft. The pistons are therefore able to sweep through limited angular motion and during each motion increase the volume of one series of combustion chambers and decrease the volume of the other series of combustion chambers. A mechanical activating mechanism is provided so that the central hub is caused to rotate in a reciprocating manner through various angular positions that are predetermined in relation to the angular position of the rotor; in this manner the piston sweeping motion is precisely linked to the angular position of the rotor. Appropriate ports and ignition components are provided so that fuel and air can enter the various combustion chambers in proper sequence, be compressed, burned and exhausted also in proper sequence.

10 Claims, 11 Drawing Figures

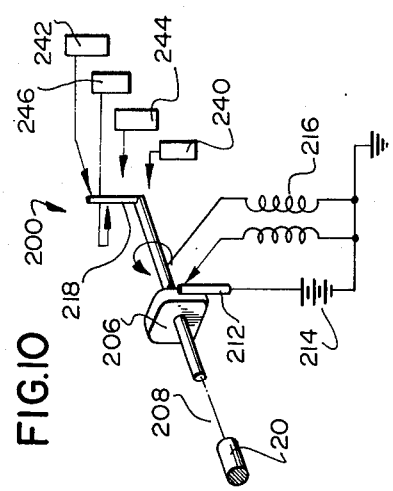
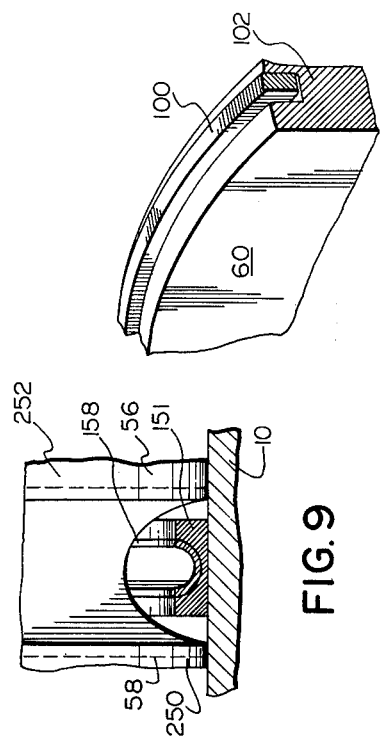
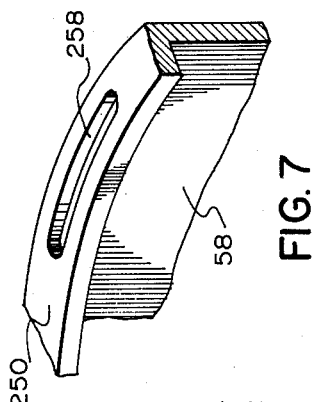
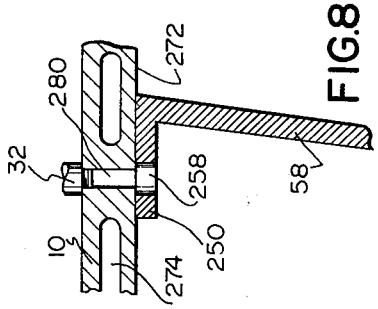
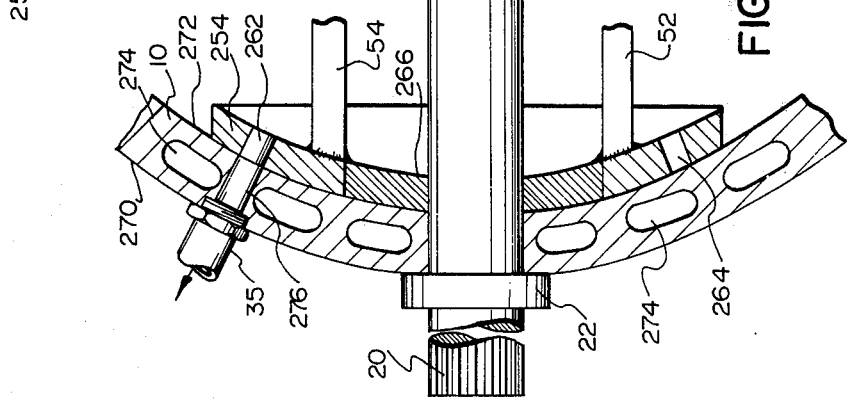

ROTARY INTERNAL COMBUSTION ENGINE WITH OSCILLATING PISTONS

This application is a continuation-in-part application of Ser. No. 518,093 filed Oct. 25, 1974, now abandoned. This application relates to an internal combustion engine and in particular describes and claims a structure which performs as an improved internal-combustion engine and is also capable of being constructed in a similar manner to function as a fluid pump.

The three main types of internal-combustion engines that have been successful are the reciprocating piston engine, the rotary piston engine (sometimes called the Wankel-type engine) and the turbine engine. The present invention is in no way related to the turbine engine, and is a piston-type engine but not of the type commonly used for motor car engines. The present invention may be described as a rotary piston engine that has a rotor shaft about which certain parts rotate, but which differs from the Wankel-type engine in that the piston motion takes place between two planes; one fixed in relation to and parallel to the central shaft, and the other located near the mid-point of the central shaft and at right angles to and rotating with the rotor shaft.

Reciprocating engines of the kind that have been used in motor cars for many years have of course been highly successful. The Wankel-type engine that has appeared more recently has also been quite successful to date. However, both of the engines of the kind just referred to have disadvantages which it is believed that embodiments of the present invention will overcome. In the up-down piston type engine of the traditional automobile type, there is a considerable amount of engine motion in proportion to the power output. That is to say, the four stroke cycle as applied to a reciprocating engine involves one-half revolution of the crankshaft for the intake stroke, one-half revolution for the combustion stroke, one-half revolution for the power stroke and onehalf revolution for the exhaust stroke, amounting to two complete revolutions to complete the cycle. The Wankel-type engine is superior from the standpoint of engine motion is relation to the power developed, but up to the present time the Wankel-type engine has not shown as good fuel economy or cleanness of exhaust products as its theoretical characteristics would lead one to expect. It seems that a reciprocating piston engine is basically a very efficient type, subject to the disadvantage referred to that a large amount of engine motion is necessary in order for the reciprocating engine to function. A reciprocating engine also requires a large number of moving parts.

The point just expressed has been recognized indirectly in the design changes over the past 25 years that have resulted in considerably shorter piston stroke in relation to the piston diameter. That is to say, the motor car engines in the early days of motor car design had an extremely long piston stroke, often of the order of twice the piston diameter, necessitating a very large amount of piston motion in relation to the power produced; in recent years the length of piston stroke has been greatly decreased until now a large proportion of reciprocating piston engines have a stroke length which is of the same order as the piston diameter and in some cases the length of stroke is less than the piston diameter. It is thus well-known that there is some advantage in keeping the amount of engine motion to a minimum in proportion to the power generated and the present invention achieves a very low amount of engine motion in relation to the power generated.

It is also well known that there is a distinct advantage, both from the viewpoint of smoothness of operation and simplicity and low weight of engine, in avoiding a circumstance where rotary motion is produced purely from reciprocal motion of connecting pistons which themselves have no rotary motion.

The principal object of the present invention is therefore to achieve the objectives just discussed and to provide an engine which is efficient, which generates a large amount of power in proportion to engine motion as well as in proportion to weight, and which additionally is of a design which lends itself to ease of manufacture.

Advantages are achieved in several respects, including a minimum amount of piston motion relative to power generated, and a relatively high ratio of power pulses to shaft revolutions, as compared to alternative types of engines.

In brief outline, the internal-combustion engine contemplated by the present invention makes use of combustion chambers which are segments of a sphere and the engine of the present invention has eight such segmental combustion chambers. The engine of the present invention functions by means of an angular sweeping piston motion rather than linear motion as in the traditional piston engine. In the present invention each piston moves in a segmental combustion chamber to provide variable chamber volume. It is contemplated that the segmental combustion chambers will be mounted so as to rotate within a spherical shell and that the boundaries of each combustion chamber will have three principal surfaces; the rotatable piston, a partition fixed in relation to the piston and the portion of the inner spherical surface of the shell within which both move. An important feature of the present invention is that the piston motion does not take place in the direction of rotation but in an angular direction in relation to the plane of rotation of the engine.

Each piston being mounted in a hollow segmental spherical space, the angular piston motion provides a variable volume for two adjacent parts of the hollow segmental spherical space. The latter are the combustion chambers. As the volume in one of each of the pairs of chambers decreases with the angular piston movement, the volume of the other chamber correspondingly and simultaneously increases. There are four such pairs of chambers in each unit that is an embodiment of the present invention, each pair of chambers occupying just slightly less than one-quarter of the entire spherical configuration.

Another important feature of the present invention is that inlet and exhaust ports communicate with each chamber and are closed and opened merely by being covered and then exposed by motion of the rotor. An exhaust outlet passage and port and a fuel inlet passage and port must operate for each chamber when it reaches the appropriate position in its rotation, in effect similar to the effect obtained by valves in a reciprocating piston engine. In one engine revolution, each variable chamber or "cylinder" goes through four steps, namely expansion, contraction, expansion, contraction; resulting, respectively, in an engine in the cycle stages of intake, compression, power and exhaust.

A further important feature of the present invention is that all matching sealing and bearing surfaces between components (fixed and variable) and the internal surface of the engine casing have the same radius of curvature as the internal surface of the engine casing. In other words, there are no "knife-edge" seals, a highly important matter from the viewpoint of component wear.

A still further important feature of the present invention is the configuration or shape of each variable chamber. Each such chamber is relatively compact and simple in shape, thus leading to efficient combustion and minimal content of pollutants in engine exhaust gases.

Finally, the spherical configuration of the invention leads to maximum strength and minimum use of material per unit of working volume.

It has already been pointed out that the engine of the present invention may also be constructed to function as a pump and it will be seen that the structure just referred to is suitable for function as a pump, with power being applied to the shaft.

The invention will now be described with reference to the accompanying drawings in which the same reference numerals denote like parts throughout. In the drawings, FIG. 1 shows a general external view of a typical engine made in accordance with the present invention but without indicating in any detail the structure or function thereof;

FIG. 6 is an enlarged fragmentary cross-sectional view of the same port ring illustrated in FIG. 5 together with a portion of the adjacent structure of the engine;

FIG. 7 is an oblique enlarged fragmentary view of one of the inboard port rings forming part of the rotor illustrated in FIG. 3;

FIG. 8 is an enlarged fragmentary cross-sectional view of the same port ring illustrated in FIG. 7 together with a portion of the adjacent structure of the engine;

FIG. 9 is an enlarged fragmentary "spot" view of a portion of the rotor illustrated in FIG. 3 as seen in FIG. 3 in plan, looking downwardly upon the forward extremity of the rotor where a cut out portion appears;

FIG. 10 shows a diagramatic and partly schematic view of the main ignition components of an engine as contemplated by the present invention.

FIG. 11 is a fragmentary, partly cross-sectioned view showing the manner in which the sealing of the appropriate rotor elements herein described are constructed so as to provide an adequate seal against the passage of gas;

Figure 1:
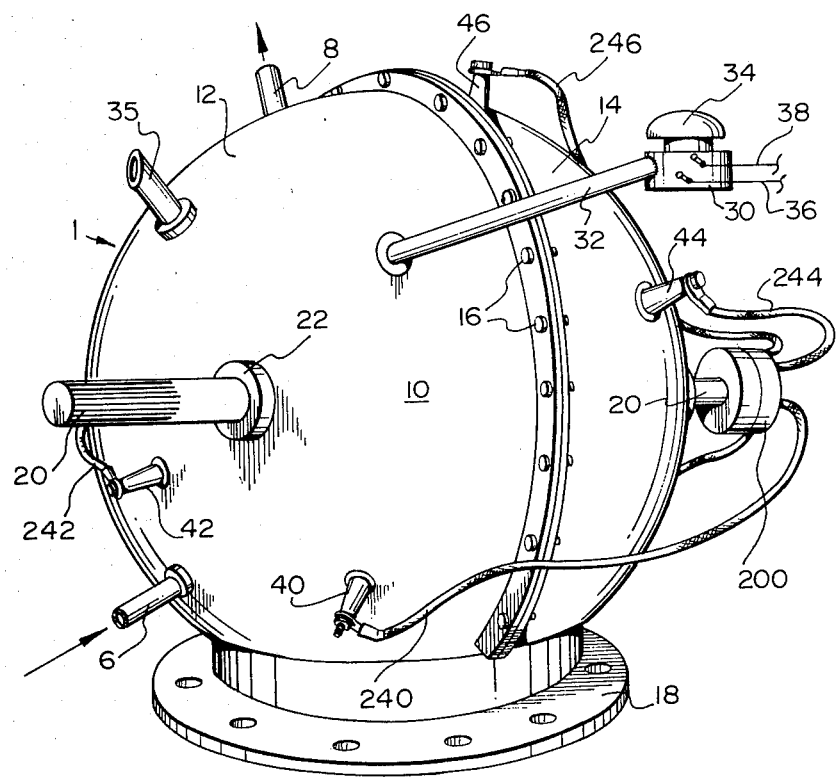
Figure 16:
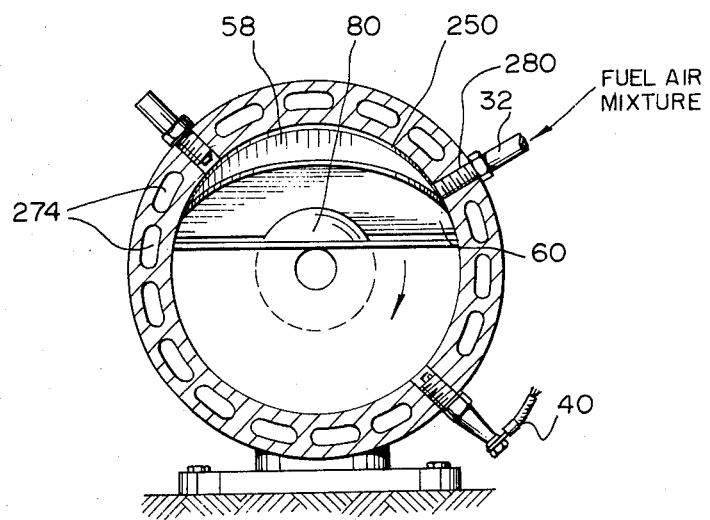
Figure 17:
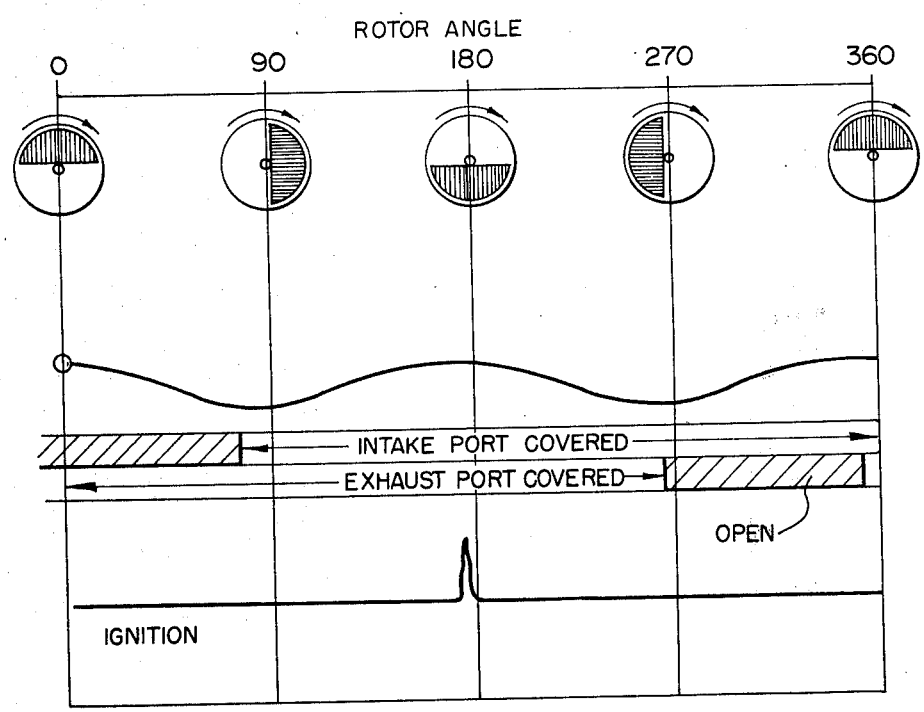

FIG. 16 shows a vertical cross-sectional view of the device illustrated in FIG. 1 in order to show the details of one combustion chamber function; and, FIG. 17 shows a graphical representation of the various component functions that make up the overall function of the engine that is contemplated by the present invention through various angular positions; specifically, a pictorial representation of one piston of the engine showing typical position that it occupies; the shape of the guide and follower; the valve port position and the ignition occurrence; all plotted against angular position of the rotor.

Referring now to the drawings and in particular FIG. 1 which illustrates a general external view of a typical engine made in accordance with the present invention but without indicating in any detail the function thereof, the motor contemplated by the present invention is illustrated generally at 1. A casing denoted by 10 which is generally spherical in shape corresponds to the engine block and engine head of the traditional automobile engine and contains the moving parts to be described below. In view of the spherical shape of casing 10 it will be found practical to make casing 10 in two halves denoted as 12 and 14, held together by bolts denoted by 16. A base is shown at 18.

Inside the motor 1 is a rotor to be described below, and protruding from the casing 10 are elements of the rotor being portions of the rotor shaft denoted by 20. Suitable bearings denoted by 22 are provided in casing 10 and shaft 20 rotates in bearings 22 in a conventional manner.

The form of motor 1 illustrated and described is a liquidcooled motor and a coolant inlet pipe is shown at 6 and a coolant exit pipe at 8, but the present invention is not limited to liquid cooled motors.

The motor 1 has a suitable fuel-supply means. Motor 1 is not limited to any particular kind of fuel supply and may have a conventional carburetion system, a fuel-injection system of known type or may be in the form of a diesel engine. For purposes of illustration motor 1 will be shown and described assuming motor 1 has a conventional carburetor system. Attached to casing 10 is a carburetor 30 of conventional type. Carburetor 30 is connected to motor 1 through an intake pipe denoted by 32 and fuel-air mixture is thus enabled to enter the engine 1 in the manner to be described below making use of certain ports to be referred to below. Also shown in FIG. 1 in outline form are conventional carburetor system components, namely an air cleaner denoted by 34, a throttle lever denoted by 36 and a choke lever denoted by 38.

In the interests of simplicity, only one intake pipe 32 is shown in full. In practice, several intake pipes would ordinarily be used, all communicating with suitable intake ports (inside the engine and not shown in FIG. 1). There may be a single carburetor with a manifold of several intake pipes, and there may be more than one carburetor, just as with existing automobile engines.

Four spark plugs of conventional type are shown at 40, 42, 44 and 46.

Attached to shaft 20 is an ignition distributor denoted by 200 and spark plug wires 240, 242, 244 and 246 connect to spark plugs 40, 42, 44 and 46 respectively. The ignition system of the present invention is relatively simple, largely because of the fact that the ignition cycle takes place once per revolution of the rotor for each combustion chamber.

As will be discussed more fully below, each spark plug fires twice per rotor revolution — once every 180°. For the engine as a whole, there are eight power impulses per rotor revolution, occurring actually as four "pairs" of impulses per rotor revolution.

The ignition system of engine 1 thus provides four ignition pulses per revolution of shaft 20, each pulse causing ignition in two combustion chambers, that is, four pairs of pulses. Referring particularly to FIG. 10 where the main ignition components are illustrated diagramatically, the distributor 200 has a cam denoted by 206 turned by shaft 20, of which only a small fragmentary portion is seen in FIG. 10. The linkage between shaft 20 and cam 206 is denoted schematically by 208. Cam 206 would typically be a 4-lobe cam. Because of the fact that there are four ignition pulses per shaft revolution, the 4-lobe form of cam 206 is an obviously suitable form. Conventional circuit breaker points are shown at 212. A battery is denoted at 214 and a spark coil at 216. A distributor rotor as denoted at 218 supplies high-tension electrical energy to spark plug wires 240, 242, 244 and 246 and thence to the spark plugs 40, 42, 44 and 46 in a conventional manner. In case there is a direct drive, there could be eight instead of four high-tension outlets to spark plug wires 240, 242, 244 and 246. Magneto ignition may also be used.

As an alternative to spark ignition, as already indicated, the engine of the present invention may be a diesel engine in which case suitable fuel injection means would be provided. Once the concept of the invention is appreciated, it will be obvious to one skilled in the art that the engine may be modified to diesel form.

A single intake pipe 32 has already been referred to in the interests of simplicity. Similarly a single exhaust manifold tube as denoted by 35 is shown, and there would ordinarily be several of such exhaust pipes each of which would be joined together in a manifold. Each of the exhaust pipes as denoted by 35 will communicate with ports on the inside of the engine to be described below.

As will be described in greater detail below, the rotor turns inside casing 10 and during appropriate portions of the cycle fuel-air mixture is drawn in through intake manifold pipes as denoted by 32 followed by compression, combustion and exhaust. Then exhaust is expelled through exhaust manifold pipes, one of which is denoted by 35.

Figure 2:
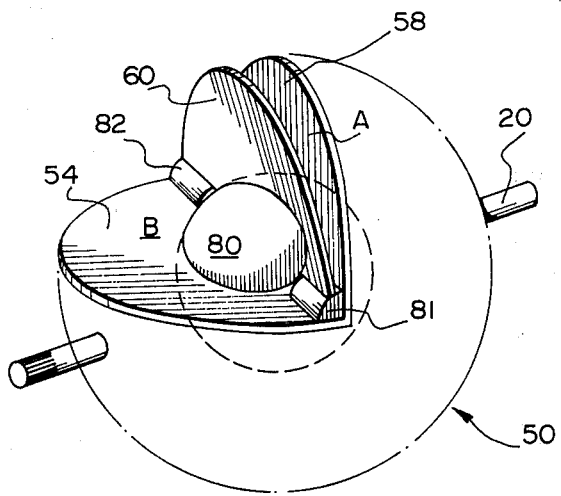
FIG. 2 is a schematic diagram illustrating the basic piston function of the present invention.

FIG. 2 illustrates the piston motion and function inside the apparatus of FIG. 1. As has been already indicated and as will be described below, the ports for intake and exhaust are important features of the present invention, but for illustrating the piston motion and function it will be assumed that the fuel-air mixture is able to reach the proper places inside the engine 1, and that the exhaust may be expelled. In FIG. 2 only two combustion chambers are shown in the interests of simplicity. In FIG. 2 the rotor that turns inside engine 1 is shown schematically at 50, on shaft 20. Only a portion of rotor 50 is illustrated in FIG. 2 also in the interests of simplicity. Part of rotor 50 is a segmental fixed partition member denoted by 54 that is parallel to the axis of shaft 20 but displaced a short distance away from shaft 20. At right angles to partition member 54 is a similar segmental fixed partition member denoted as 58 which is displaced a short distance away from the "equator" of rotor 50. Mounted in an angular position in the right-angle between partition members 54 and 58 is a piston member denoted as 60.

It is contemplated that piston member 60 will sweep angularly over part of the angle between partition members 54 and 58, so as to form piston chambers on either side of piston member 60. The piston chambers are denoted by A and B, and both piston chambers A and B are closed in on the third side by means of the inner spherical surface of casing 10.

In the center of rotor 50 is a hub denoted as 80, to be described in more detail below. All that need be said at this point of the description is that piston member 60 is rigidly attached to hub 80 and hub 80 has an angular sliding motion with respect to partition members 54 and 58.

Because the piston motion of piston member 60 is not about the major axis of the spherical space defined by partition members 54 and 58, piston member 60 cannot move about the line of intersection of partition members 54 and 58, and so radial fillets denoted as 81 and 82 are provided on either side of hub 80 as shown, rigidly attached to partition member 54 and 58. In addition to providing surfaces against which piston 60 moves, the fillets 81 and 82 also strengthen the structure of rotor 50. The rotation of hub 80 is in a direction angularly to shaft 20 and such motion causes piston member 60 to be swept back and forth in an angular direction, so as to either increase the volume of piston chamber A and decrease the volume of piston chamber B, or vice versa. Thus the piston function of motor 1 is easily appreciated.

It is contemplated that rotor 50 will have four portions each having the same structure as has just been described in relation to FIG. 2.

Figure 3:
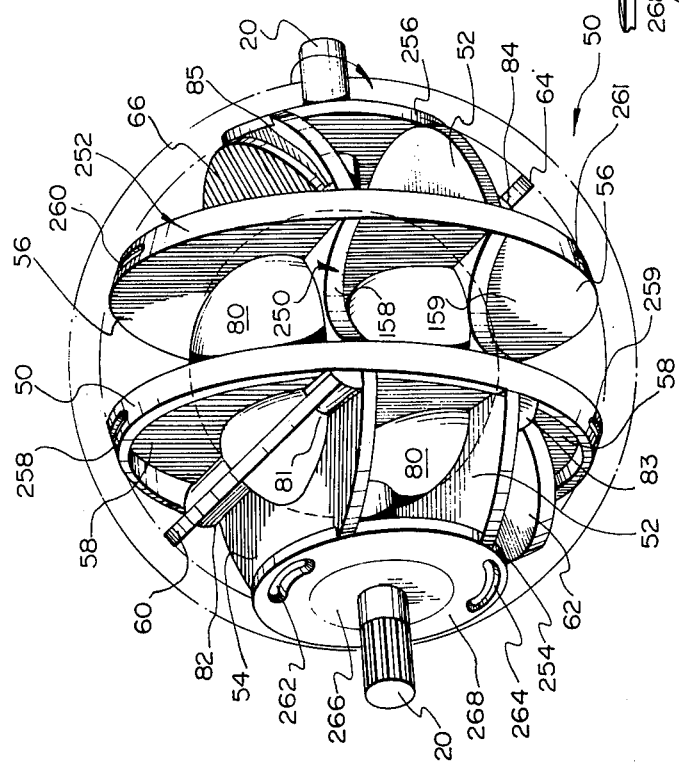
FIG. 3 shows a three-quarters view of the rotor that is intended to be inside the structure shown in FIG. 1.

Referring now to FIG. 3 where a three-quarters view of the rotor that is intended to be inside the structure of FIG. 1 is illustrated, the more complete structure of rotor 50 can be seen. Rotor 50 consists of the shaft 20 already referred to, and on shaft 20 are two circular partition members, 54 (already referred to) and the partition member denoted by 52 which members are parallel and each in a plane which is parallel to the axis of shaft 20.

Two further circular partition members, 58 (already referred to) and the partition member denoted by 56 are mounted as part of rotor 50 and are similar in size and construction to partition members 52 and 54, but partition members 56 and 58 are mounted parallel to one another and each in a plane parallel to the plane of rotation of shaft 20.

As already indicated, partition member 54 is at right angles to circular partition member 58 and the circular partition members 54 and 52 are likewise at right angles to circular partition members 56 and 58. Thus four substantially right-angled segmental sections of a sphere are formed in the space between each of the circular partition members 54, 58; 54, 56; 52, 58 and 52, 56. It will be seen that as the rotor 50 rotates, the spaces formed between the circular partition members 52, 54 and 56, 58 are carried around in the direction of rotation. Mounted in the space between each of the circular partition members 52, 54 and 56, 58 are the piston members denoted by 60, 62, 64 and 66. Each of piston members 60, 62, 64 and 66 are centrally fixed on hub 80 already referred to, so that motion of any of the piston members 60, 62, 64 and 66 in the space between the circular partition members 52, 54 and 56, 58 occur simultaneously such that the space volume between circular partition member 58 and piston member 60 will be increased at the same time as the space volume between circular partition member 54 and piston member 66 will be increased; likewise at the same time as the space volume between circular partition member 52 and piston member 62 will be increased, and likewise the space volume between fixed partition member 56 and piston member 64 will be increased.

It will be obvious that as the space volume on one side of each of piston members 60, 62, 64 and 66 is increased, the space volume on the opposite side of each such piston member will be decreased, and vice versa.

As was stated in relation to FIG. 2, fillets 81 and 82 are provided between partition members 54 and 58 for proper motion and sealing of piston member 60. In FIG. 3 fillets 81 and 82 are again shown as well as fillets 83, 84 and 85. Other fillets (not shown) would also be provided in the same manner as already described.

It is contemplated that rotor 50 will rotate inside casing 10 and that each of the fixed partition members 52, 54 and 56, 58 and each of the piston members 60, 62, 64 and 66 will, at their curved peripheries contact and brush against the inner spherical surface of casing 10 and the fixed partition members will at their inner central parts contact and brush against the hub 80. It will be necessary to provide sealing means at the lines of contact referred to but such sealing means are known in the art and need not be described in detail. Referring particularly to FIG. 11, by way of example, a small segment of piston member 60 is shown to illustrate the manner in which the sealing surface is constructed. In the elements shown in FIG. 11, a sealing strip denoted by 100 is shown inserted in a groove denoted by 102 in piston member 60 and similar construction will be used throughout wherever any one of the partition members 52, 54, 56, and 58 contact the hub 80 or one of the fillets 81, 82, 83, 84, 85 or other fillets not shown on the drawing, and wherever any one of the partition members 52, 54, 56 and 58 and piston members 60, 62, 64 and 66 contact the inner surface of shell 10.

Attention is directed to the smooth surface contact at the interfaces of the sliding surfaces rather than the knife-edge contact often found at sealing points in certain kind of engines.

Figure 4:
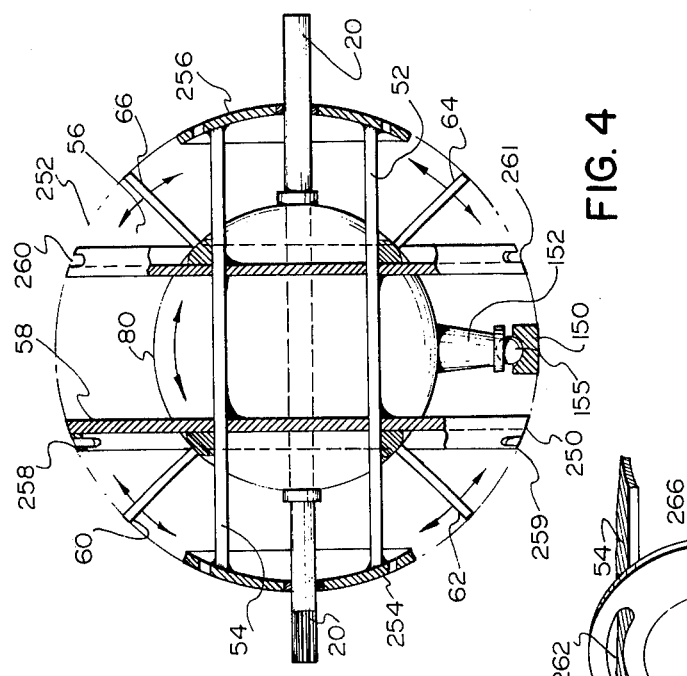
FIG. 4 shows a front elevation view of the rotor illustrated in FIG. 3.

The manner of the motion of the movable walls or piston members 60, 62, 64 and 66 will now be described. As already stated, piston members 60 – 66 are centrally fixed on a common member, hub 80. As shown in FIGS. 3 and 4 hub 80 is spherical in form. For reasons to be set forth below, hub 80 may be spherical or it may be cylindrical. If hub 80 is spherical it will be concentric with the rotor 50, and if hub 80 is cylindrical, it will have its axis perpendicular to the plane of FIG. 4 and passing through the center of rotor 50.

That is to say, because of the angular motion of the piston members 60, 62, 64 and 66 just referred to, it will be seen that hub 80 could be in the form of a cylinder if desired with its axis at the center of rotor 50 and parallel to the intersection of partition members 54 and 58. FIG. 4 will be discussed assuming that hub 80 is spherical in shape.

Hub 80 is capable of limited rotation about a theorectical axis passing through the center of hub 80 but parallel to the intersection between partition members 54 and 56. In other words, the fixed portion of rotor 50 (in relation to motion parallel to the plane of FIG. 4) is the shaft 20 and the partition walls 52, 54, 56 and 58, and the movable portion is hub 80 and the piston members 60, 62, 64 and 66 attached to hub 80. Hub 80 and the piston members 60, 62, 64 and 66 are capable of a small amount of rotation as limited by the partition walls 52, 54, 56 and 58.

Figure 12:
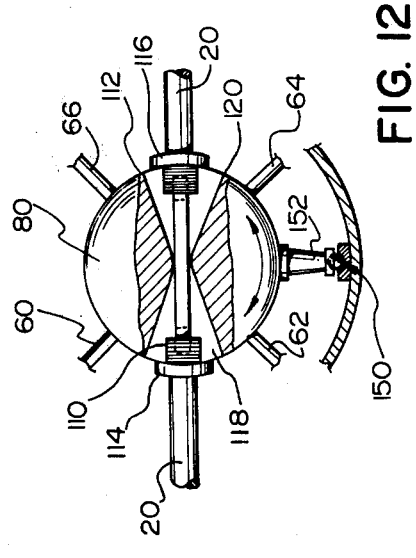
FIG. 12 shows a fragmentary cross-sectioned view of a central portion of the rotor of the engine referred to herein.
Figure 13:
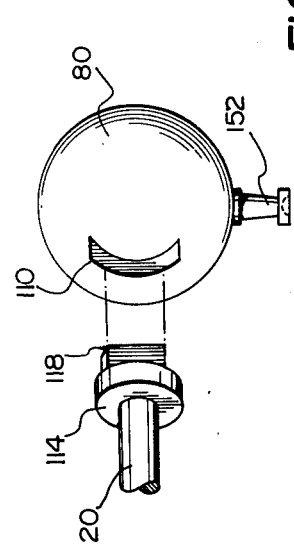
FIG. 13 shows a fragmentary exploded view of a left-hand portion of what is shown in FIG. 12.

Hub 80 is slip-key fastened to shaft 20 so that shaft 20 and hub 80 are locked together so far as rotation around the longitudinal axis of shaft 20 is concerned but hub 80 is able to have angular rotation in relation to shaft 20 as shown by the arrows in FIG. 12. For this purpose, the structure shown in FIGS. 12 and 13 is provided. FIG. 12 is a fragmentary partly cross-sectional view of the hub 80, and FIG. 13 is an exploded view of hub 80 with a portion of shaft 20 and associated elements.

In FIG. 12 a portion of each of the piston members 60, 62, 64 and 66 are shown attached to hub 80. On each side of hub 80 is a keyway denoted by 110 and 112, respectively. Integrally attached to the left-hand side of shaft 20, as seen in FIG. 12 is a boss denoted by 114, and on the opposite side of shaft 20 is a similar boss denoted by 116. Each of the boss members 114 and 116 is made so as to present a concave surface facing hub 80, so that hub 80 can turn in relation to boss members 114 and 116. Integrally attached to boss 114 is a key denoted by 118 and a similar key denoted by 120 is attached to boss 116. Key 118 fits into keyway 110 and key 120 fits into keyway 112. It will be seen that keyway 110 is just wide enough to admit key 118, but that the length of keyway 110 is greater than the length of key 118 so that hub 80 may turn in relation to key 118, and thence in relation to shaft 20 (in the plane of FIG. 12) but that key 118 and thence shaft 20 are locked together so far as rotation around the longitudinal axis of shaft 20 is concerned. The construction of keyway 112 and key 120 are similar. In the exploded view of FIG. 13, only a portion of the structure just described is shown.

In order that fuel-air mixture may be introduced into the combustion chambers intake and exhaust ports are, as already indicated, provided. Port rings denoted by 250, 252, 254 and 256 are attached to the rotor 50. Port ring 250 is attached to and may be integral with partition member 58 and since port ring 250 is near the center of engine 1, it will be referred to for convenience as the "inboard" port ring 250. Inboard port ring 250 has two ports therein, denoted by 258 and 259. It is contemplated that as rotor 50 rotates, the port 258 will alternatively register with the opening from intake pipe 32 and exhaust pipe 35, so that fuel-air mixture is admitted at appropriate times to the combustion chamber formed between partition member 58 and piston 60, and at appropriate times the exhaust discharged therefrom through exhaust pipe 35.

Similarly the other inboard port ring 252 carries two ports, denoted by 260 and 261 and in a similar manner the intake and exhaust of the compression chamber formed between partition member 56 and piston member 66 are controlled.

It will also be obvious that the same inboard port rings 250 and 260 control the intake and exhaust of the compression chambers formed between partition member 58 and piston member 62, and between partition member 56 and piston member 64, respectively.

The port rings 254 and 256, for convenience called the "outbord" port rings similarly control the intake and exhaust of the remaining compression chambers. Outboard port ring 254 has two ports described by 262 and 264 which register with intake and exhaust openings in casing 10 (not shown) and ports 262 and 264 will control the intake and exhaust of the combustion chambers between partition member 54 and piston 60, and between partition member 52 and piston 62.

Outboard port ring 256 similarly has ports (not shown) and those perform a similar function in relation to the combustion chambers formed between partition member 54 and piston member 66; and between piston member 52 and piston member 64, respectively.

All of the port rings 250, 252, 254 and 256 are solid rings that have an outside surface with the same radius of curvature as, and slide against, the inner surface of motor casing 10; the rings are firmly attached to the fixed circular members and rotate with them.

The FIGS. 5, 6, 7 and 8 explain in a little further detail the manner in which the port rings 250, 252, 254 and 256 function in the engine 1.

Figure 5:
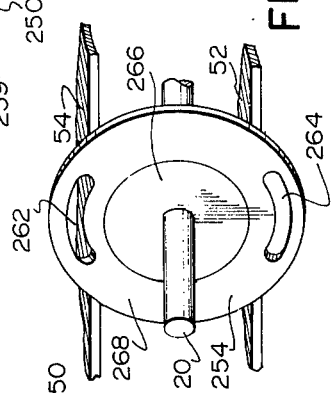
FIG. 5 is an oblique enlarged fragmentary view of one of the outboard port rings forming part of the rotor illustrated in FIG. 3.

In FIGS. 5 and 6 outboard port ring 254 is particularly referred to and it will be understood that this present discussion applies to outboard port ring 254. Outboard port ring 254 is rigidly attached to partition members 52 and 54 and is integral with and attached to a centrally-disposed disc denoted as 266 which is mounted concentrically with outboard port ring 254 and shaft 20. Referring now to FIG. 6, where the elements just referred to are seen in section, there is additionally shown in cross-section a fragmentary part of casing 10, having an outer surface denoted by 270 and an inner surface denoted by 272. Inside casing 10 are coolant passages denoted by 274 which are for the purpose of dissipating excess heat generated inside the engine 1 similar to the function of coolant passages found in the block of a reciprocating liquid-cooled engine. Tubes 6 and 8 communicate with coolant passages 274. It is also contemplated by the present invention that instead of liquid cooling, air cooling could be used with suitable cooling fins and associated air flow, as is well known in the internal-combustion engine art.

Outboard port ring 254 will clearly have a convex surface denoted by 268. Outboard port ring 254 is mounted so as to be capable of rotating so that convex surface 268 on the outer face of outboard port ring 254 will always lie in contact with the inner surface 272 of casing 10. Disc 266 does not have to contact inner surface 272.

The ports 262 and 264 in port ring 254 rotate with shaft 20 and are caused to register with intake and exhaust openings in casing 10. An exhaust tube 35 has communication through exhaust opening 276 in casing 10. As seen in FIG. 6, port 262 in port ring 254 is registering with exhaust opening 276, and in the position shown in FIG. 6 the engine 1 would be at the stage of its cycle that exhaust is being expelled from the combustion chamber between partition member 54 and piston member 60.

The manner that port 264 registers with exhaust opening 276 will be apparent from FIG. 6. The ports 262 and 264 will also register with intake openings (not shown).

FIGS. 7 and 8 show how the inboard port rings 250 and 252 function in relation to the combustion chambers adjacent thereto. FIG. 7 illustrates in fragmentary form a portion of inboard port ring 250 attached to partition member 58 showing a single port, that is port 258.

FIG. 8 illustrates in fragmentary cross-sectional form the same elements, partition member 58, inboard port ring 250 and port 258 with adjacent structure of engine 1, that is a portion of casing 10 showing coolant passages 274. Inboard port ring 250 is machined so that it has a sliding fit with the inside surface 272 of casing 10. As shown in FIG. 8, part 258 is registering with an intake opening denoted by 280 that connects to intake pipe 32 already referred to. In the position shown in FIG. 8, the engine 1 would be at that portion of its cycle that the combustion chamber between partition member 58 and piston member 60 is at the intake stage.

The hub 80 is caused to turn clockwise and countercloskwise (as seen in FIG. 4) which in turn causes the piston members 60, 62, 64 and 66 to sweep between the fixed partition members 52, 54, 56 and 58. Since rotor 50 runs inside casing 10 and the piston members and the fixed partition members make a seal with the inside of casing 10, the effect of the sweeping of the piston members 60, 62, 64 and 66 is to vary the volumes of space defined by the parts just referred to in a manner analogous to the way in which the reciprocating pistons of a conventional motor car engine cause variable volumes of space to be created in the structure of the engine.

As the rotor rotates inside the casing 10 the piston members 60, 62, 64 and 66 are caused to take up particular positions related to the position of rotation in a manner similar to the pistons of a reciprocating engine. Many means for providing the oscillating movement will be apparent, but the simple one shown here is by means of a sine-wave groove running around inside the casing and a follower attached to hub 80. The groove is shown at 150 in FIGS. 4, 12; 14 and 15 and the follower is denoted at 152.

Figure 14:
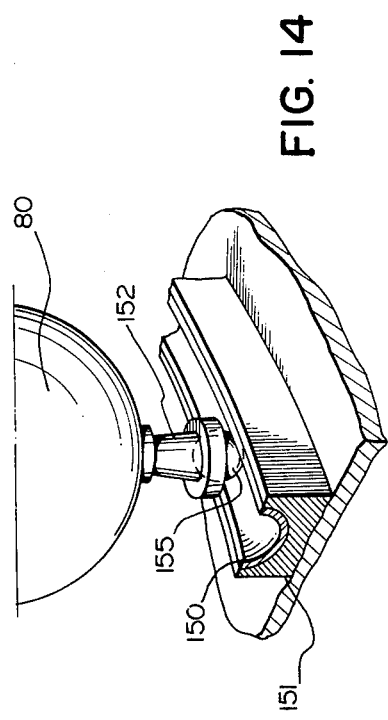
FIG. 14 is a three-quarters fragmentary view showing the structure which causes the piston elements of the structure described to move in the manner desired.
Figure 15:
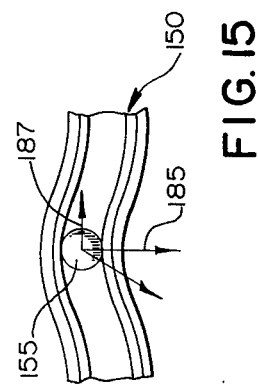
FIG. 15 shows a flattened-out schematic diagram to illustrate the relative motion of the elements of FIG. 14.

In FIG. 14, which is a three-quarters fragmentary view showing a portion of the groove 150 as well as the follower 152, the hub 80 is shown in a fragmentary manner. The groove consists of a semi-circular cross-section channel-like member following an undulating path as particularly shown in FIG. 15 where a "flattened out" view of the groove 150 is shown. Groove 150 may be in a channel-like member as shown denoted by 151 attached to a portion 154 of the structure of the casing 10, or the channel like member and the portion 154 of the casing 10 may all be integral. The follower 152 is attached to hub 80 in any convenient manner but must be rigidly attached. At the extremity of follower 152 is a rolling spherical bearing denoted as 155. The direction of rotation is shown by the arrow and as the rotor 50 and the hub 80 turn, spherical bearing 155 is caused to follow groove 150, causing the follower 152 to undulate as shown in FIG. 15. This causes the hub 80 to turn back and forth, and the piston members 60, 62, 64 and 66 are caused to sweep back and forth. Because channel-like member 151 passes the whole way around the inside of casing 10 there must be cut-out portions at the edges on each side of partition members 56 and 58, as denoted for one side at 158 and 159. As particularly seen in FIG. 9 where the cut-out portion 158 is shown between partition members 56 and 58, the channel-like member 151 does not interfere with the rotation of rotor 50.

Several alternative means of providing the oscillating motion to hub 80 are available. For example, follower 152, instead of being guided by a spherical bearing riding in a sine-wave track, could be guided by an eccentric gear driven disc which is turned by rotation or rotor 50.

Lubrication as required may be introduced through the outer engine casing to the internal surfaces of that casing.

Lubrication means may be provided in the space between partition members 56 and 58, including pump, sump, and other required components. Lubrication to the inner surface of motor casing 10 may be provided also between partition members 52 and 54, so that effectively the inner spherical surface of motor casing 10 is constantly having oil introduced to it, thus minimizing wear between it and the seals. The reciprocating motion of follower 152 is particularly suited to provision of forced lubrication.

Before discussing further the motion of the piston members 60, 62, 64 and 66 and the hub 80 in detail, it will be convenient to further discuss the manner in which the fuel or fuel-air mixture reaches the chamber formed such as between piston member 60 and partition member 58. This will be apparent from the previous discussion relating to the port rings 250, 252, 254 and 256. Reference will now be made to FIG. 16 wherein there is shown an elementary form of rotor such as is illustrated in FIG. 2, but shown in the direction as would be seen from the left-hand side of FIG. 2. In FIG. 16 the partition member 58 and the piston member 60 are shown in their relative position in a cross-sectional representation of casing 10. The coolant passages 274 can be seen in FIG. 16. Partition member 58 and piston member 60 are assumed to be rotating in a clockwise direction such that the intake port 280 has just been uncovered. A portion of intake pipe 32 can also be seen. A fuel-air mixture passes through the pipe 32 and into the intake port 280, and thence into the space formed between partition member 58 and piston member 60. The inboard port ring 250 is shown in FIG. 16 in elevation.

As the rotor 50 continues to rotate, the action of groove 150 and follower 152 (not visible in FIG. 16) sweep piston member 60 in a direction away from partition member 58 thus enlarging the space between partition member 58 and piston member 60 and drawing in a fuel-air mixture through port 280 in a manner similar to the drawing in of a fuel-air mixture into the combustion chamber of a conventional automobile engine when the piston is descending on the intake stroke. As the rotor 50 rotates, piston member 60 continues to move away from partition member 58 until the rotation is such that port 280 is covered. When port 280 is cut off, the fuel-air mixture that is in the space between partition member 58 and piston member 60 is locked in place and is now ready for compression. At this point the groove 150 curves in such a way that the follower 152 moves the piston member 60 in the opposite direction namely toward partition member 58 thus compressing the fuel-air therebetween. At this point no ports are open in relation to this particular compression chamber. This is analogous to the compression stroke of a conventional reciprocating piston engine of an automobile.

Just before the end of the compression stroke, the rotor has rotated so that the compressed space between partition member 58 and piston member 60 comes opposite the ignition means which in the present case is a spark plug denoted by 40. Spark plug 40 is caused to deliver a spark at an appropriately timed position which is related in a simple manner to the rotation of rotor 50. The power stroke then begins and piston member 60 is forced to sweep outwardly away from partition member 58 thus delivering power to piston member 60, which in turn delivers power to the hub 80 and in turn delivers power to the follower 152 which by means of reaction against the groove 150 causes the rotor 50 to be given an impulse in the same direction as that in which it is turning. It will be readily seen that since the groove 150 undulates from side to side creating an impulse against the edge of groove 150 at an appropriate time will cause the spherical bearing 155 to press firmly against the edge of groove 150 and a component of the force applied by spherical bearing 155 against groove 150 causes rotor 50 to continue to turn in its original direction of rotation.

Referring particularly to FIG. 15, the spherical bearing 155 of follower 152 is shown in the groove 150. The force shown as vector 185 has a component that is parallel to the direction of rotation denoted as vector 187 and this component, by means of the well-known principle of action-reaction, causes the follower 152 to be moved along in the direction of rotation.

Referring now to the graphical representation of FIG. 17, the 0° position corresponds to the position as shown in FIG. 16. Piston 60 is in an intermediate position between partition members 54 and 58, and the intake port 280 is uncovered.

As the rotor 50 rotates clockwise, to the 90° position, the follower 152 is moved upwardly as shown in FIG. 12 and piston 60 is caused to sweep forwardly as seen in the top line of FIG. 17. This motion increases the space between partition member 58 and piston 60, creating reduced atmospheric pressure in intake pipe 32, causing fuel-air mixture to move toward rotor 50. Just before the 90° position intake port 280 has been covered and the air-fuel supply is cut off.

Now as the rotor moves to the 180° position, the ports are both closed, piston member 60 moves toward fixed partition member 58 and the contents of the space there between is compressed. Just before the 180° position is reached, the distributor 200 causes the spark plug 40 to ignite the fuel and a rapid pressure rise in the chamber takes place.

The rapid pressure rise in the chamber causes pressure on piston member 60 which in turn produces pressure between follower 152 and groove 150. By reason of the angle of groove in the region between the 180° and the 270° positions, rotor 50 is given a firm push in its direction of rotation and the rotor returns to its initial position at the 360° (i.e. 0°) position.

Similar action takes place in all eight chambers, and it is unnecessary to detail the corresponding steps that take place in the remaining chambers.

It will be seen that the apparatus herein described and claimed presents a novel structure for an internal-combustion engine of obvious design advantages.

While a single engine unit has been described and while such unit is inherently smooth in operation, it will be appreciated that combinations of two or more such engine units may be combined on one shaft with such positioning that the power impulses of one engine unit are interspaced with the power impulses of the other or others, and a very high degree of smoothness of operation achieved.

The embodiments of the invention in which an exclusive property or privilege is claimed are defined as follows:

1. An internal-combustion engine comprising
a casing having a generally spherical inner surface and having separate inlet and exhaust openings therethrough,
a rotor shaft rotatably mounted in the casing,
a rotor mounted on the shaft and within the casing, the rotor having a plurality of outlying points thereon, the loci of the outlying points defining during rotor rotation a generally spherical surface which is essentially in contact with the inner surface of the casing, and the rotor containing at least one combustion chamber in the form of a hollow segment of a sphere,
angularly disposed piston means within the combustion chamber, and
porting means carried by, affixed to, and rotating directly with the rotor and directly alignable with the inlet and exhaust openings in the casing for selective admission and emission of gaseous media to and from the combustion chamber.

2. An internal-combustion engine comprising
a generally spherical casing having an inner, substantially spherical surface,
a rotor mounted rotatably within and substantially along an axis of the casing,
the rotor including
a rotor shaft,
at least one first fixed partition mounted perpendicularly to the rotor shaft,
at least one second fixed partition mounted parallel to the rotor shaft,
the first and second fixed partitions together with a portion of the inner surface of the casing enclosing a space that is substantially a right-angled segment of a sphere,
a centrally mounted hub which is capable of limited rotational motion relative to the rotor about an axis at right angles to and passing through the axis of the rotor shaft,
at least one piston member attached fixedly to the hub and positioned between the first and second partitions, two wedge-like shaped chambers being formed by the two partitions, the inner casing surface, the hub surface, and the piston member's surfaces,
linkage means for positioning the hub in relation to the rotor to cause the piston member to vary the volume of the two chambers, and
porting means for each of the chambers which is attached to and rotated with the first and second fixed partitions to allow gaseous media to enter into and exhaust from each chamber at predetermined positions of the rotor, and
ignition means serving each chamber for firing at predetermined positions of the rotor by the linkage means.

3. An internal-combustion engine in accordance with claim 2, wherein there is at least one intake opening in the casing and at least one exhaust opening in the casing, and wherein there is at least one port ring affixed to and carried by the rotor and arranged to move in close proximity to the intake and exhaust openings to permit gaseous media to move therethrough.

4. An internal-combustion engine in accordance with claim 2, wherein each of the partitions and the piston member are provided with sealing means against gas passage at the region of contact of the partitions and the piston member with the inner surface of the casing, all such sealing means having the same radius of curvature as the inner surface of the casing with which they contact.

5. An internal-combustion chamber engine comprising
a rotor of generally spherically outlined shape,
a rotor shaft upon which the rotor is mounted,
a shell within which the rotor is mounted and having a matching concave spherical inner surface,
a series of variable volume combustion chambers of wedgelike spherical segment shape being formed in recesses in the rotor, the series being even in number,
at least one partition member affixed to the rotor shaft and forming one angular extremity of each of the chambers,
a similar series of moveable piston members forming the other angular extremity of each of the chambers,
each of the chambers also being bounded by a portion of the spherical inner surface of the shell,
a central hub mounted within the rotor to which each of the piston members are attached and which also forms a boundary of each of the chambers,
the central hub being mounted in a manner so as to have limited angular rotation about an axis which is perpendicular to and passes through the rotor shaft,
a mechanical actuating means connected to the central hub and contacting the shell for rotating the hub and the piston members to predetermined positions relative to the rotational position of the rotor,
porting means attached to the partition members, the porting means rotating with and about the same axis as the rotor shaft and at substantially the same angular velocity as the rotor shaft, the porting means having openings therethrough for admission of air and fuel to each of the chamber for combustion and for discharge of exhaust after combustion from the chamber in a proper sequence, the openings communicating at appropriate and predetermined times with openings in the spherical shell, the actuating means being constructed so as to cause, for each combustion chamber, a full intake, compression, power and exhaust cycle during a single revolution of the rotor shaft, and
ignition means mounted on and connected through the shell for igniting the fuel and air within each of the combustion chambers at appropriate times.

6. An internal-combustion engine in accordance with claim 5, wherein means are provided within the rotor for internal lubrication of the engine.

7. An internal-combustion engine in accordance with claim 5, wherein the actuating means comprises a sinusoidal track affixed to and generally around the equator of the inner surface of the shell and a ball-tipped follower affixed to the central hub and engaging the track.

8. An internal-combustion engine in accordance with claim 5, wherein the ignition means is a series of spark plugs whose number is one-half of the number of combustion chambers so that each spark plug serves two combustion chambers during a single revolution of the rotor shaft.

9. An internal-combustion engine in accordance with claim 8, wherein the number of combustion chambers is 8.

10. An internal-combustion engine in accordance with claim 8, wherein means are provided for sealing each of the relatively rotating members from each other.

* * * * *